United States Patent
Perez Guevara

(10) Patent No.: US 10,817,305 B2
(45) Date of Patent: Oct. 27, 2020

(54) SYSTEM AND METHOD TO CONFIGURE COMMUNICATION LANES OF A CENTRAL PROCESSING UNIT

(71) Applicant: DELL PRODUCTS, LP, Round Rock, TX (US)

(72) Inventor: Alberto David Perez Guevara, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 393 days.

(21) Appl. No.: 15/605,172

(22) Filed: May 25, 2017

(65) Prior Publication Data

US 2018/0341497 A1 Nov. 29, 2018

(51) Int. Cl.
*G06F 9/4401* (2018.01)
*G06F 21/57* (2013.01)
*G06F 13/40* (2006.01)

(52) U.S. Cl.
CPC ........ *G06F 9/4403* (2013.01); *G06F 13/4027* (2013.01); *G06F 21/575* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 7,971,050 B2 | 6/2011 | Joshi et al. | |
| 2004/0025001 A1* | 2/2004 | Stevens, Jr. | G06F 9/4411 713/2 |
| 2004/0088531 A1* | 5/2004 | Rothman | G06F 9/4411 713/1 |
| 2007/0186088 A1 | 8/2007 | Khatri et al. | |
| 2007/0276981 A1* | 11/2007 | Atherton | G06F 13/4022 710/307 |
| 2008/0162878 A1* | 7/2008 | Zimmer | G06F 9/441 712/203 |
| 2012/0260015 A1 | 10/2012 | Gay et al. | |

OTHER PUBLICATIONS

UEFI Platform Initialization Specification, vol. 1: Pre-EFI Initialization Core Interface; Unified EFI, Inc. Version 1.3. Section 2.3, pp. 10-11. Mar. 29, 2013. Downloaded Jul. 15, 2019 from http://www.uefi.org/sites/default/files/resources/PI_Spec_1.3.zip (Year: 2013).*
Intel; "Intel® Desktop Boards: BIOS Settings Dictionary—By Menu". V13. Nov. 2009. Accessed from https://www.intel.com/content/dam/support/us/en/documents/motherboards/desktop/sb/biosglossarybymenu_v13.pdf on Jan. 29, 2020. (Year: 2009).*

* cited by examiner

*Primary Examiner* — Kim Huynh
*Assistant Examiner* — Joshua Neveln
(74) *Attorney, Agent, or Firm* — Larson Newman, LLP

(57) ABSTRACT

An information handling system includes a memory and a central processing unit. The memory stores a boot image for a boot process of the information handling system. The central processing unit loads the boot image and executes the boot process. During the boot process, the central processing unit performs a pre-EFI initialization phase that configures a socket of the central processing unit during an auto-discovery of the socket, and stores the socket configuration in a memory.

15 Claims, 6 Drawing Sheets

SYSTEM AND METHOD TO CONFIGURE COMMUNICATION LANES OF A CENTRAL PROCESSING UNIT

FIELD OF THE DISCLOSURE

The present disclosure generally relates to information handling systems, and more particularly relates to configuring communication lanes of a central processing unit.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a memory and a central processing unit. The memory can store a boot image for a boot process of the information handling system. The central processing unit can load the boot image and execute the boot process. During the boot process, the central processing unit can perform a pre-EFI initialization phase of the boot process. During the pre-EFI initialization phase, the central processing unit can configure a socket of the central processing unit during an auto-discovery of the socket, and can store the socket configuration in a memory.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
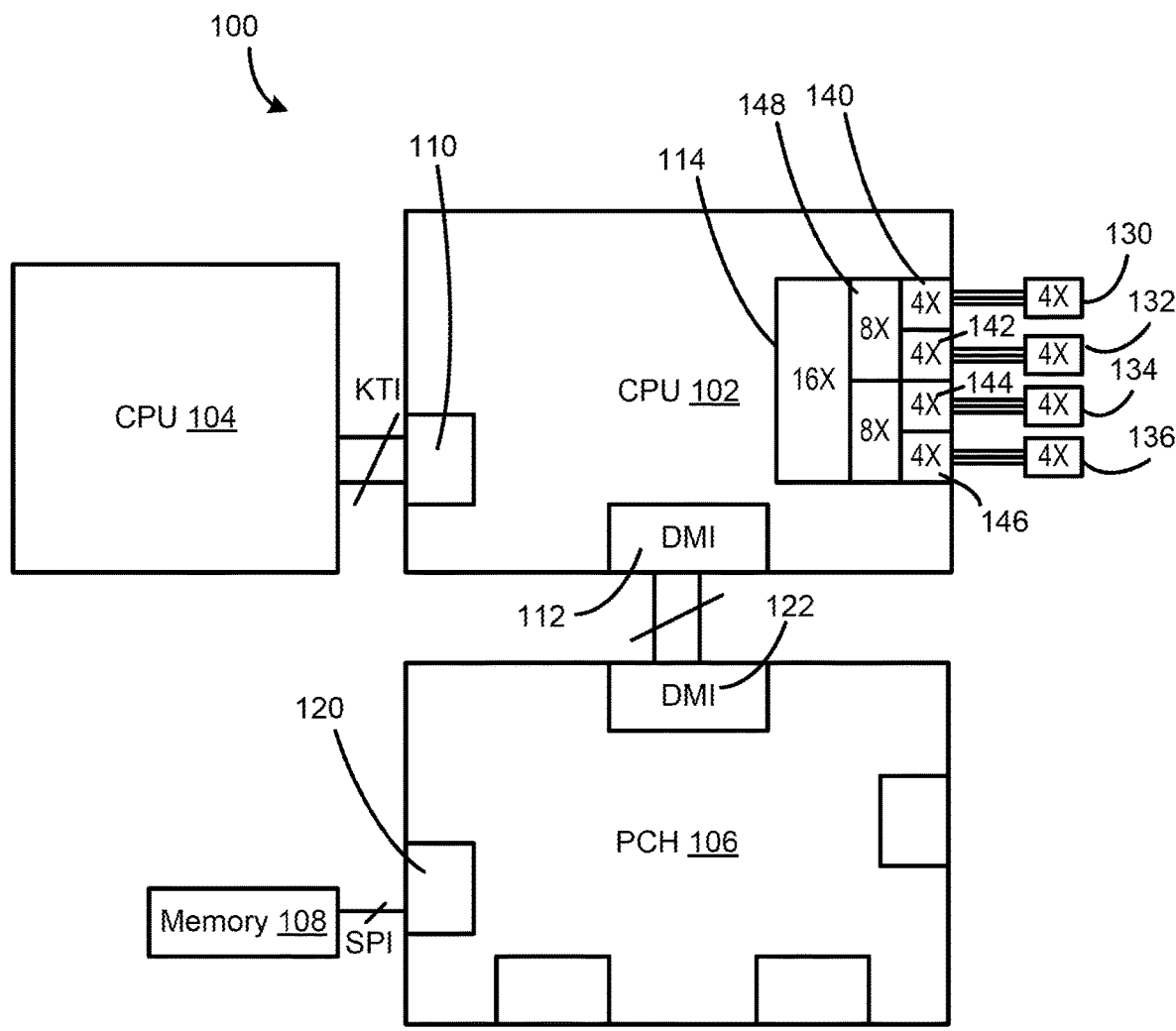
FIG. 1 is a block diagram of a platform hub controller and multiple central processor units of an information handling system according to at least one embodiment of the present disclosure.
Figure 2:
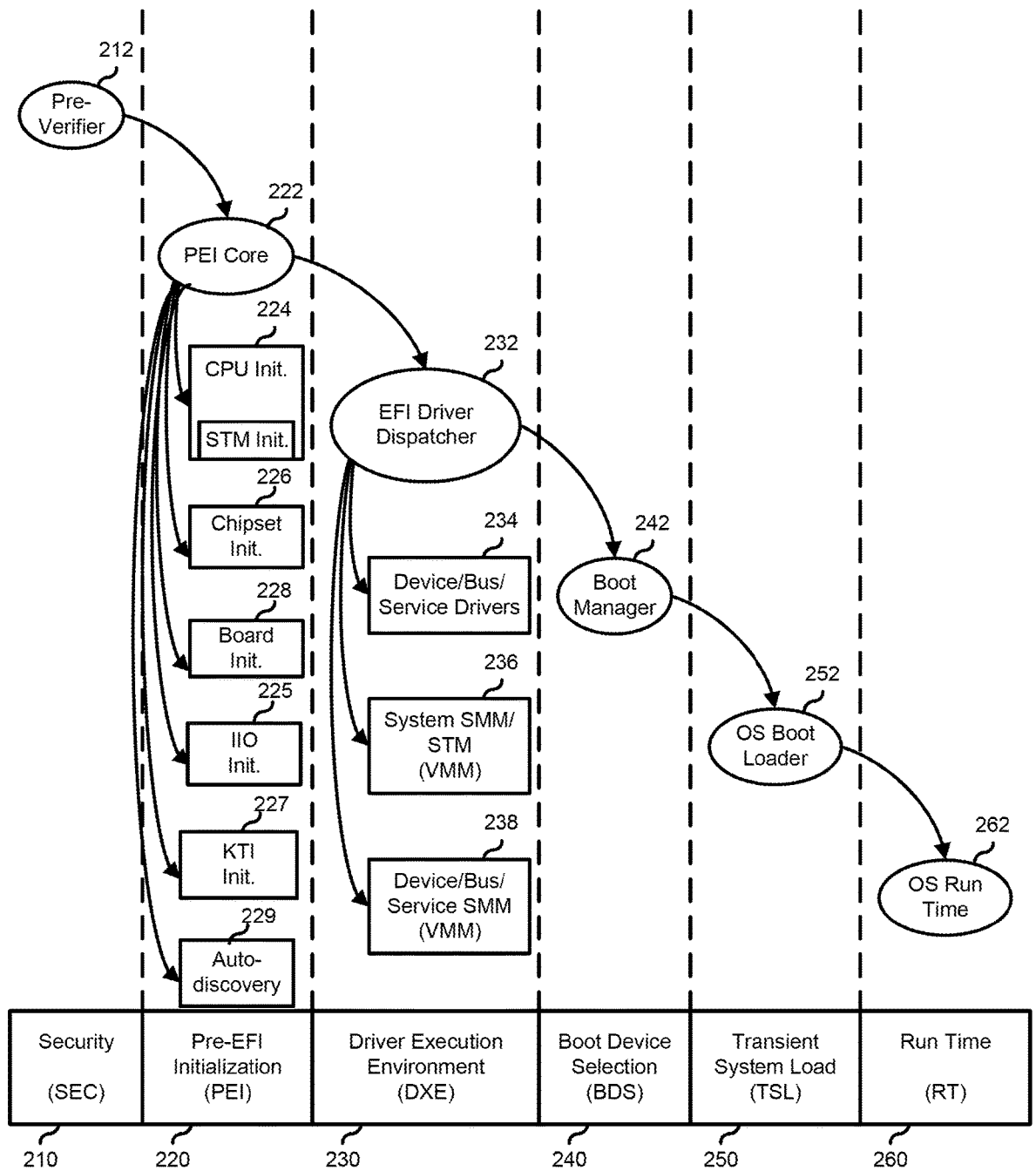
FIG. 2 is a boot phase diagram for the information handling system according to at least one embodiment of the present disclosure.

FIGS. 1 and 2 show a power supply system 100 for an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more buses operable to transmit communications between the various hardware components.

The information handling system includes central processing units (CPUs) 102 and 104, a platform controller hub (PCH) 106, and a memory 108. The CPU 102 includes multiple ports/sockets, such as a KTI port 110, a direct media interface (DMI) port 112, and a peripheral component interconnect express (PCIe) port 114. In an embodiment, the CPU 102 can include additional ports/sockets not described herein without varying from the scope of the disclosure. In an embodiment, the CPU 104 can include multiple ports/sockets that are similar to the ports/sockets of the CPU 102. However, for clarity and brevity the configuration of the ports/sockets will be described only with respect to CPU 102, but the same configuration can be performed for the CPU 104 and the PCH 106 without varying from the scope of the disclosure. The PCH 106 includes multiple ports/sockets, such as a serial peripheral interface (SPI) port 120 and a direct media interface (DMI) port 122. The PCH 106 can communicate with the memory 108 via the SPI port 120 to retrieve unified extensible firmware interface (UEFI) basic input/output system (BIOS) firmware from the memory 108 during a boot process of the information handling system 100.

In an embodiment, the CPU 102 can communicate with the CPU 104 via KTI bus connected to the KTI port 110 of CPU 102. The CPU 102 can communicate with the PCH 106 via a DMI bus connected between DMI port 112 and DMI port 122. The CPU 102 can communicate with one or more devices via the PCIe port 114 being connected to one or more ports/sockets 130, 132, 134, and/or 136.

During operation, the PCIe port 104 can be configured as four separate slots each having X4 lane width, as two separate slots each having X8 lane width, or as a single slot having a X16 lane width. The PCIe slot 104 can be configured during a basic input/output system (BIOS) boot operation of the information handling system 100. During the BIOS boot, the PCIe slot 114 can be configured to different number of slots with different lane widths depending on the slots 130, 132, 134, and/or 136 connected to the PCIe slot 104 as will be described with respect to FIGS. 2 and 3 below.

FIG. 2 illustrates a boot phase diagram 200 for an information handling system that operates using a UEFI, including a security phase (SEC) 210, a pre-EFI initialization phase (PEI) 220, a driver execution environment phase (DXE) 230, a boot device selection phase (BDS) 240, a transient system load phase (TSL) 250, and a run time phase (RT) 260. SEC 210 is the first phase of a UEFI boot process on the information handling system 100 that operates to set up a pre-verifier 212. Pre-verifier 212 handles all restart events on the information handling system 100, and temporarily allocates a portion of memory 108 for use during the other boot phases. SEC 210 is executed out of the firmware resident on the information handling system 100, and so serves as a root of trust for the system. The SEC phase 210 can find, validate, and run the PEI phase 220. The SEC phase also can initialize any trusted platform management (TPM) modules within the information handling system 100, can initialize and run a built-in self test (BIST) for the CPU, such as CPU 102, and can initialize a cache memory or memories associated with the CPU 102.

SEC 210 can then pass execution to PEI 220 which initializes the system memory for the information handling system 100. PEI 220 includes CPU initialization 224, chipset initialization 226, and board resource initialization 228. PEI 220 can also perform early input/output (I/O) initialization 225 for the CPU 102, KTI initialization 227, and auto-discovery 229 of communication lanes for a socket of the CPU 102, such as PCIe socket 114. The initial I/O initialization 225 sets up early input/output protocols. The Keizer Technology Interconnect (KTI) initialization 227 can detect the resources that are available for the sockets of the CPU 102. For example, during the KTI initialization 227 a device or resource can be detected that has one or more ports/sockets 130, 132, 134, and 136 available for the PCIe socket 114. Upon completion of KTI initialization 227, the presence on different resources or sockets to communicate with the CPU 102 can be know, such that auto-discovery/lane bifurcation of lane widths for PCIe 114 can be performed. The auto-discovery 229 can then be performed to determine whether the PCIe socket 114 should be bifurcate. In an embodiment, during the auto-discovery 229 the PCIe socket 114 can be placed in a default configuration of full breakup, such that the PCIe socket 114 is divided into four separate communication lanes 140, 142, 144, and 146 that are each X4 in width.

The auto-discovery 229 can then produce a ping to be sent from each of the four X4 width lanes. In an embodiment, the pings can be produces and sent to determine whether a corresponding socket is connected to each of the individual lanes of the PCIe socket 114, and to determine a communication platform associated with any communication lane connected to one of the lanes of the PCIe socket 114. If a communication socket is connected to a lane 140, 142, 144, or 146 of the PCIe socket 114, then a response can be received at that communication lane. In an embodiment, the response can include a present indicator, a lane width, and platform information for the socket or port responding to the ping. For example, the communication lane 140 can receive a response indicating that socket 130 is present and has a X8 lane width, the communication lane 142 may not receive a response indicating that socket 132 is not present, the communication lane 144 can receive a response indicating that socket 134 is present and has a X4 lane width, and the communication lane 146 can receive a response indicating that socket 136 is present and has a X4 lane width. In this situation, communication lanes 140 and 142 can be reconfigured as a single communication lane 148 having X8 lane width, and the communication lanes 144 can 146 can remain as individual communication lanes with X4 lane width. Thus, the PCIe socket 114 can be configured as having communication lane 148 with a X8 lane width, and communication lanes 144 and 146 with X4 lane widths. The configuration of the PCIe socket 114 can be stored in a sticky scratch pad register within a memory, such as memory 108 or a cache memory local to CPU 102.

At the end of PEI 220, the UEFI boot operation can save the configurations initialized during the PEI 220, and can reset the UEFI boot operation, such that the process can begin at the SEC phase 210. In an embodiment, this reset can be a Memory Reference Code (MRC) reset that is typical found in a UEFI boot operation. This time through the boot process, SEC 210 can execute the same as described above, and the PEI 220 can operate as described above except that the configuration of the PCIe socket 114 can be loaded from the sticky scratch pad register, such that the PEI 220 does not need to complete the auto-discovery 229. PEI 220 can then pass execution to DXE 230 which performs device specific initializations for the information handling system. In particular, DXE 230 executes an EFI driver dispatcher 232 that operates to load device, bus, and service drivers 234, to instantiate the system SMI handler in the STM 236, and to instantiate virtual machines associated with the device, bus, and service SMMs 238. DXE 230 passes execution to BDS 240 executes a boot manager 242 which identifies a boot target, and passes execution to TSL 250. TSL 250 launches an OS boot loader 252 which loads the operating system, and passes execution to the operating system at RT 260.

In previous implementations of UEFI boot, the auto-discovery was performed during DXE 230 after a PCI scan and a communication bus enumeration were performed. However, in the current implementation the IIO initialization 225 and KTI initialization 227 performed during the PEI 220 enable the auto-discovery to be performed in the PEI 220 instead of DXE 230. Additionally, in previous implementations of UEFI boot, the configuration of the PCIe 114 is based on slots connected to the PCIe 114 not on a complete resource with possibly multiple slots connected to the PCIe 114. In this previous implementation, the PCIe 114 configuration would need to be reset to four slots with X4 lane widths during the DXE 230 and the boot process would then reset. In this previous implementation, the boot process would then perform SEC 210 and PEI 220 again before entering DXE 230 to configure the PCIe 114. In this previous implementation, the DXE 230 would then configure the PCIe 114 based on the lane widths on the slots connect to the PCIe 114, and then a process reset would again take place. Thus, the previous implementations with PCIe configuration in DXE 230 had two additional resets in the boot process to configure the PCIe 114 as compared to the current implementation with the PCIe configuration in PEI 220.

Techniques disclosed herein are typically implemented during PEI 220, and utilize services provided by the UEFI specification, such as boot services. UEFI applications, including OS loaders, must use boot services functions to access devices and allocate memory. Services are defined by interface functions that may be used by code running in the UEFI environment. Such code may include protocols that manage device access or extend platform capability, as well as applications running in the preboot environment, and OS loaders. During boot, system resources are owned by the firmware and are controlled through boot services interface functions. All boot services functionality is available until an OS loader loads enough of its own environment to take control of the system's continued operation and then terminates boot services with a call to ExitBootServices( ).

One class of boot services includes protocol handler services, such as LoadImage, StartImage, InstallProtocolInterface, RegisterProtocolNotify, LocateProtocol, and numerous others. A protocol consists of a 128-bit globally unique identifier (GUID) and a Protocol Interface structure. The structure contains the functions and instance data that are used to access a device. The functions that make up Protocol Handler Services allow applications to install a protocol on a handle, identify the handles that support a given protocol, determine whether a handle supports a given protocol, and the like. LoadImage loads an image, such as a device driver, into system memory, such as memory 108. StartImage transfers control to a loaded image's entry point. InstallProtocolInterface installs a protocol interface on a device handle. A driver can install multiple protocols. RegisterProtocolNotify registers an event that is to be signaled whenever an interface is installed for a specified protocol. LocateProtocol returns an array of handles that support a specified protocol. During DXE 230, boot services and runtime services can be started and a UEFI boot manager can load UEFI drivers and UEFI applications in an order defined by the global NVRAM variables. Driver initialization includes identifying a driver image that is stored on some type of media.

Figure 3:
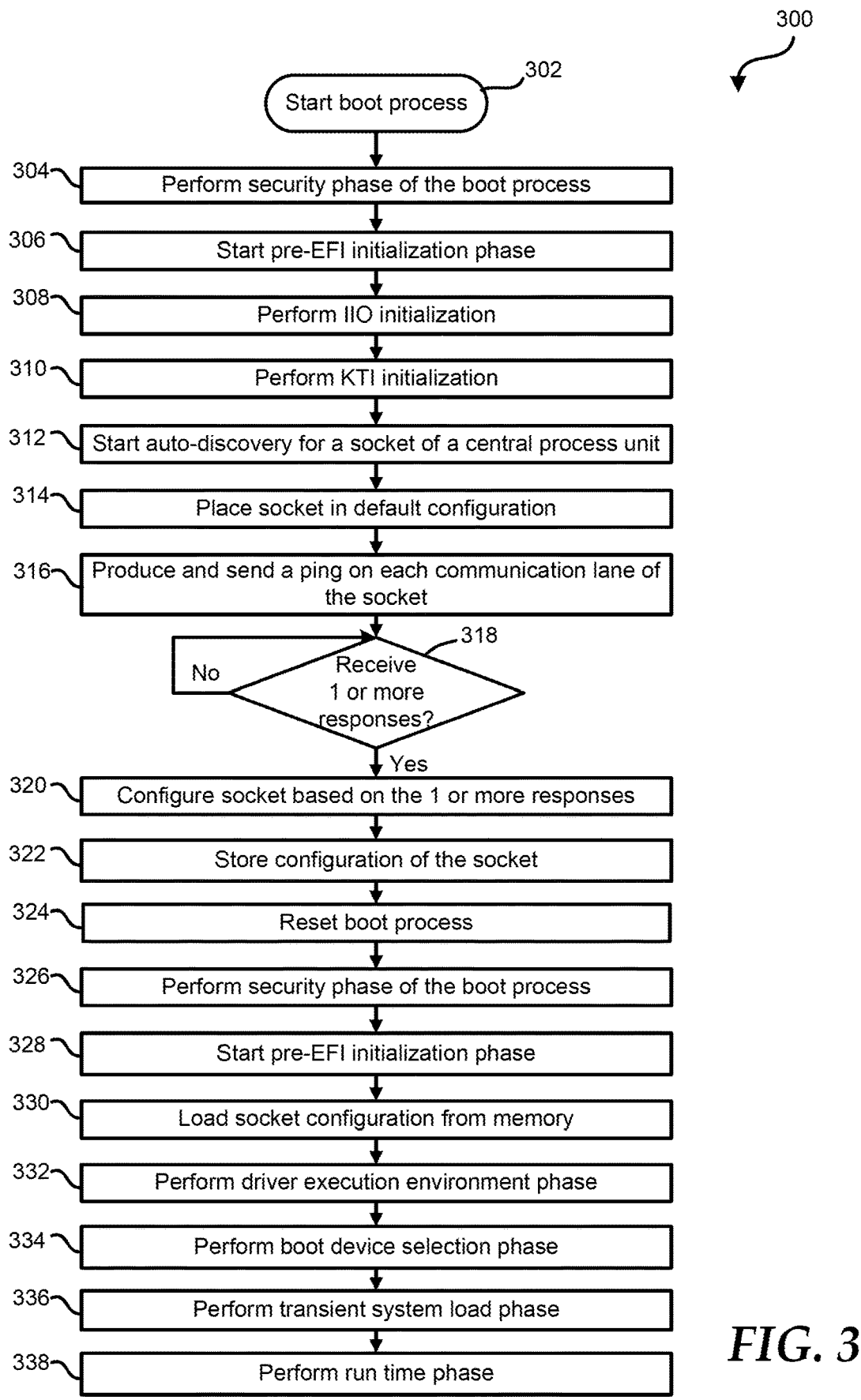
FIG. 3 is a flow diagram of an embodiment of a method for configuring communication lanes of a central processing unit of the information handling system according to at least one embodiment of the present disclosure.

FIG. 3 illustrates a method 300 for configuring communication lanes of a central processing unit of an information handling system according to at least one embodiment of the present disclosure. At block 302, a UEFI boot process is started. In an embodiment, the boot process can be started by loading a boot image to initialize an information handling system. A security phase (SEC) of the boot process is performed at block 304. At block 306, a pre-EFI initialization phase (PEI) of the boot process is started. IIO initialization is performed for the CPU 102 during PEI at block 308. At block 310, KTI initialization is performed for the CPU 102 during PEI. In an embodiment, the KTI initialization can detect the resources that are available for sockets of a CPU within the information handling system. Auto-discovery of communication lanes for the socket of the CPU is started at block 312.

At block 314, the socket is placed in a default configuration. In an embodiment, the socket can be a PCIe socket. In an embodiment, the default configuration is a full breakup, such that the socket is divided into four separate communication lanes that are each X4 in width. A ping is produced and sent from each of the four communication lanes at block 316. In an embodiment, the pings can be produces and sent to determine whether a corresponding socket is connected to each of the individual lanes of the socket, and to determine a communication platform associated with any communication lane connected to one of the lanes of the socket. At block 318, a determination is made whether one or more responses are received. In an embodiment, the response can include a present indicator, a lane width, and platform information for the socket or port responding to the ping. For example, a communication lane of the socket can receive a response indicating that a socket is present and has a X8 lane width, another communication lane of the socket may not receive a response, and other communication lanes of the socket can receive a response indicating that sockets are present and have X4 lane widths.

Configure the socket based on the one or more responses received at block 320. In the situation described above, the socket of the CPU can be configured with one communication lane having X8 lane width, and two communication lanes each with X4 lane width. At block 322, the configuration of the socket is stored in a memory. In an embodiment, the configuration can be stored in a sticky scratch pad register within a memory. The UEFI boot operation is reset at block 324. At block 326, SEC is executed. PEI is started at block 328. At block 330, the configuration of the socket is loaded from the memory. At block 332, a driver execution environment phase (DXE) is performed. A boot device selection phase (BDS) is performed bat block 334. At block 336, a transient system load phase (TSL) is performed. A run time phase (RT) is performed at block 338.

Figure 4:
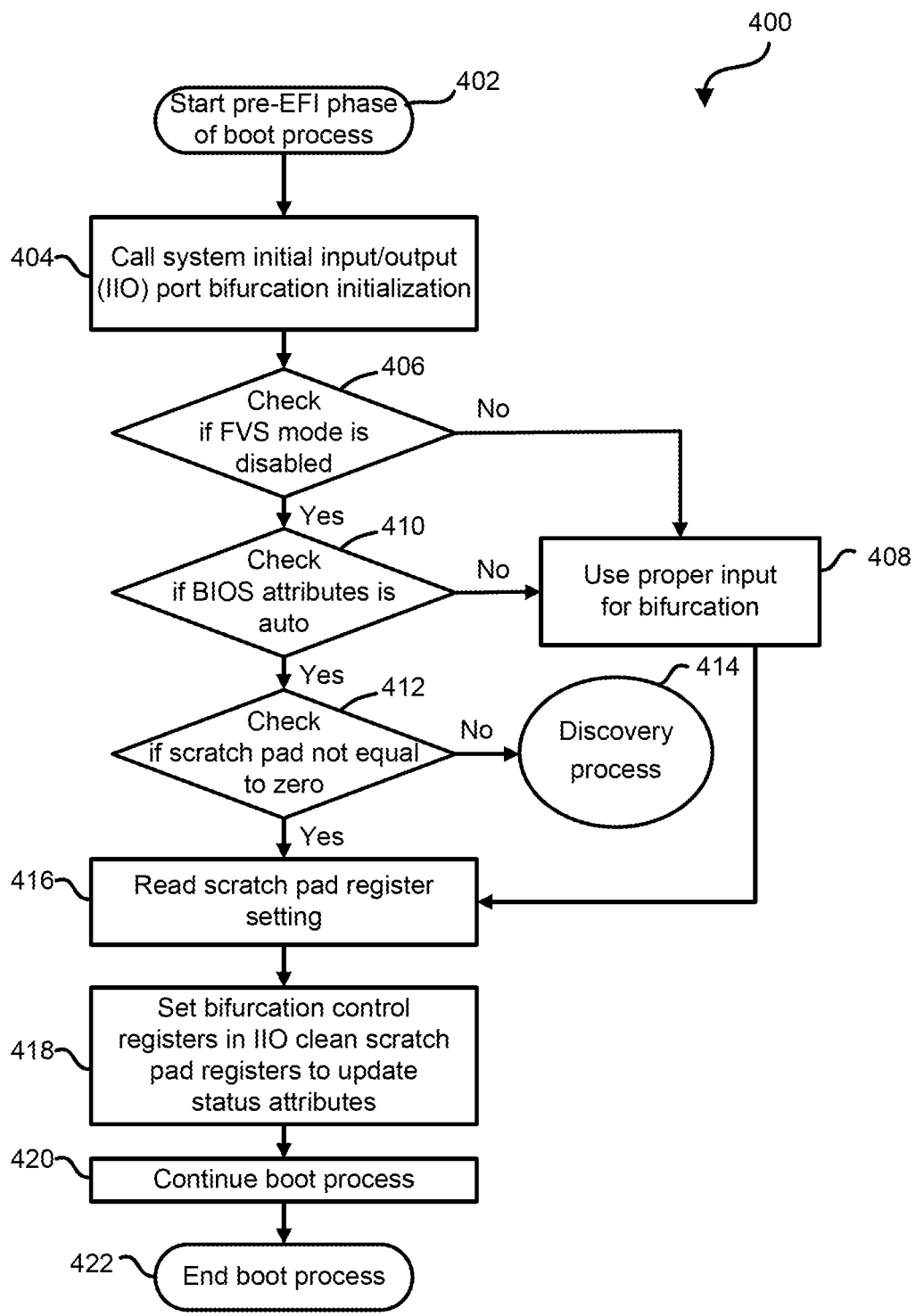
FIGS. 4 and 5 a flow diagram of another embodiment of method for configuring communication lanes of a central processing unit of the information handling system according to at least one embodiment of the present disclosure.
Figure 5:
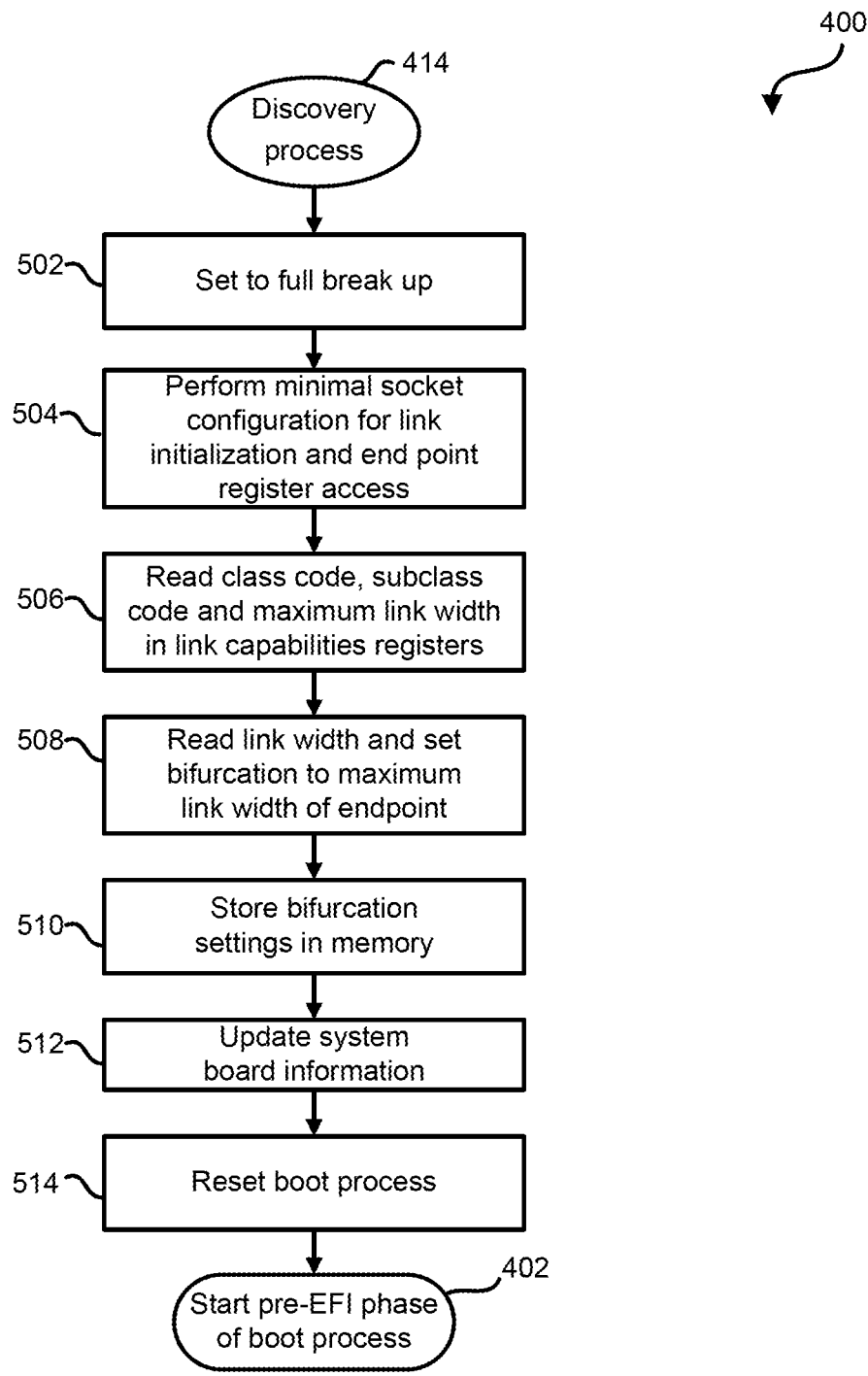

FIGS. 4 and 5 illustrate a method 400 for configuring communication lanes of a central processing unit of an information handling system according to at least one embodiment of the present disclosure. At block 402, a pre-EFI initialization phase (PEI) of the boot process is started. A system initial input/output (ITO) port bifurcation initialization is called at block 404. At block 406, a determination is made whether Functional Verification Test FVS Mode is disable. In an embodiment, the FVS Mode is the first power-on of the motherboard planar where printed circuit board assembly (PCBA) testing is performed, before the motherboard is shipped to the factory and assembled into a server chassis. The planar contains an FVS test mode pin (GPI) that is controlled by the functional test fixture to force the system into FVS Manufacturing Mode. If the FVS mode is not disabled, the flow continues at block 408 and proper input is used for bifurcation. Otherwise, if FVS mode is disabled, the flow continues at block 410 and a determination is made whether BIOS attributes are set to auto.

If BIOS attributes are not set to auto, the flow continues as stated above at block 408. Otherwise, if BIOS attributes are set to auto, the flow continues at block 412 and a determination is made whether a scratch pad is not equal to zero. If the scratch pad register is set to zero, the flow continues as described below at block 414 where the auto-discovery process is started. Otherwise if the scratch pad register is not set to zero, then the flow continues at block 416 and a scratch pad register setting is read. In an embodiment, the scratch pad register is not set to zero during a second iteration through the boot process after the auto-discovery is performed during a first iteration. At block 418, bifurcation control registers in IIO clean scratch pad registers are set to update the status attribute for the socket of the CPU. The boot process continues at block 420, and the boot process then ends at block 422.

Referring now to FIG. 5, the auto-discovery process begins at block 414. At block 502, the bifurcation of the socket is set to a full break up. Minimal socket configuration is performed for link initialization and end point register access at block 504. At block 506, class code, subclass code, and maximum link width are read from a link capabilities register. The link width for an endpoint is read and the bifurcation of the socket of the CPU is set to a maximum link width of the endpoint at block 508. At block 510, the bifurcation settings are stored in a memory. In an embodiment, the memory can be a sticky scratch pad register. System board information is updated based on the bifurcation settings at block 512. At block 514, the boot process is reset, and the flow continues as described above with respect to block 402.

Figure 6:
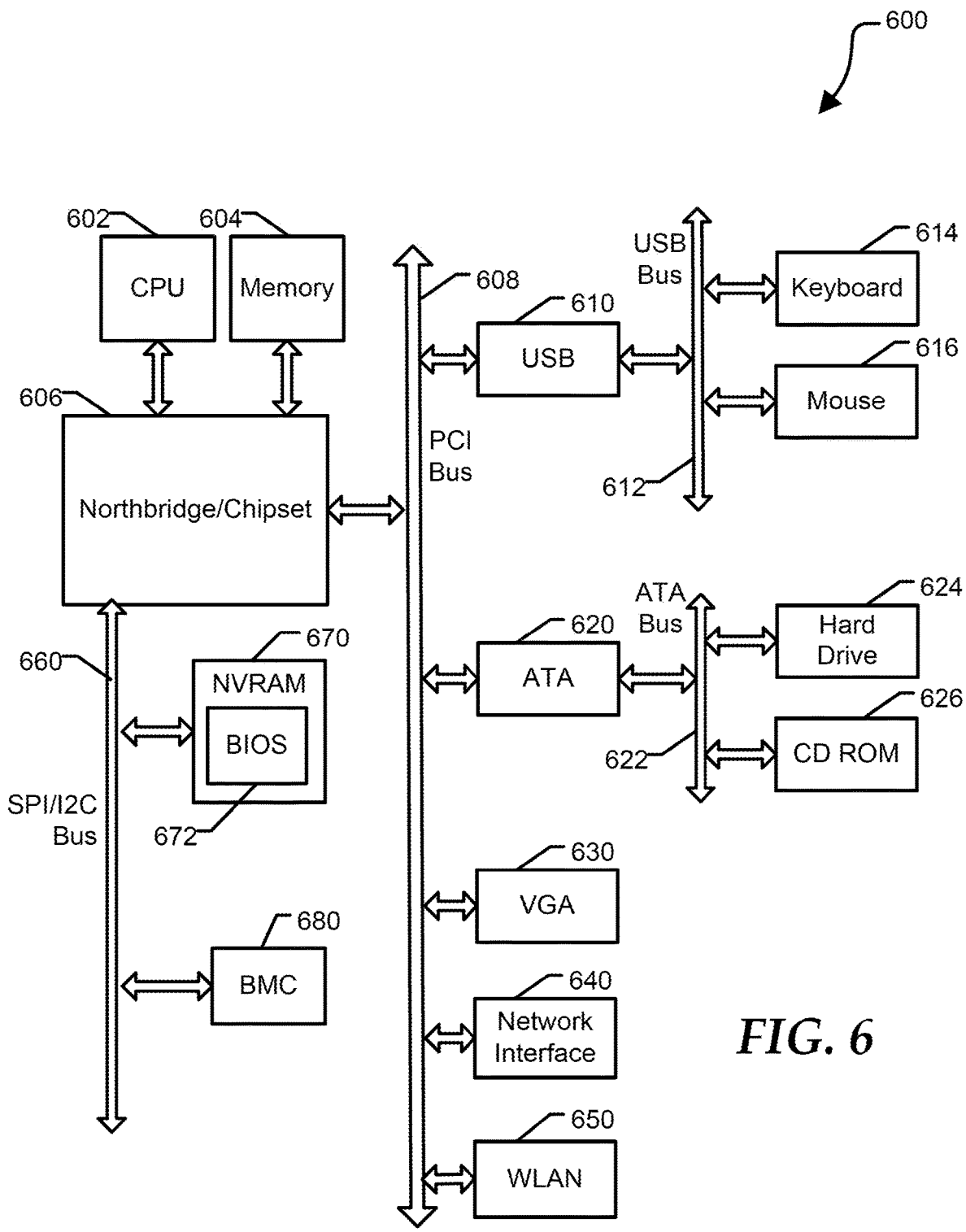
FIG. 6 is a block diagram of a general information handling system according to an embodiment of the present disclosure.

FIG. 6 illustrates a general information handling system 600 including a processor 602, a memory 604, a northbridge/chipset 606, a PCI bus 608, a universal serial bus (USB) controller 610, a USB 612, a keyboard device controller 614, a mouse device controller 616, a configuration an ATA bus controller 620, an ATA bus 622, a hard drive device controller 624, a compact disk read only memory (CD ROM) device controller 626, a video graphics array (VGA) device controller 630, a network interface controller (NIC) 640, a wireless local area network (WLAN) controller 650, a serial peripheral interface (SPI) bus 660, a NVRAM 670 for storing BIOS 672, and a baseboard management controller (BMC) 680. BMC 680 can be referred to as a service processor or embedded controller (EC). Capabilities and functions provided by BMC 680 can vary considerably based on the type of information handling system. For example, the term baseboard management system is often used to describe an embedded processor included at a server, while an embedded controller is more likely to be found in a consumer-level device. As disclosed herein, BMC 680 represents a processing device different from CPU 602, which provides various management functions for information handling system 600. For example, an embedded controller may be responsible for power management, cooling management, and the like. An embedded controller included at a data storage system can be referred to as a storage enclosure processor.

For purpose of this disclosure information handling system 600 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 600 can include processing resources for executing machine-executable code, such as CPU 602, a programmable logic array (PLA), an embedded device such as a System-on-a-Chip (SoC), or other control logic hardware. Information handling system 600 can also include one or more computer-readable medium for storing machine-executable code, such as software or data.

System 600 can include additional processors that are configured to provide localized or specific control functions, such as a battery management controller. Bus 660 can include one or more busses, including a SPI bus, an I2C bus, a system management bus (SMBUS), a power management bus (PMBUS), and the like. BMC 680 can be configured to provide out-of-band access to devices at information handling system 600. As used herein, out-of-band access herein refers to operations performed prior to execution of BIOS 672 by processor 602 to initialize operation of system 600.

BIOS 672 can be referred to as a firmware image, and the term BIOS is herein used interchangeably with the term firmware image, or simply firmware. BIOS 672 includes instructions executable by CPU 602 to initialize and test the hardware components of system 600, and to load a boot loader or an operating system (OS) from a mass storage device. BIOS 672 additionally provides an abstraction layer for the hardware, such as a consistent way for application programs and operating systems to interact with the keyboard, display, and other input/output devices. When power is first applied to information handling system 600, the system begins a sequence of initialization procedures. During the initialization sequence, also referred to as a boot sequence, components of system 600 are configured and enabled for operation, and device drivers can be installed. Device drivers provide an interface through which other components of the system 600 can communicate with a corresponding device.

Information handling system 600 can include additional components and additional busses, not shown for clarity. For example, system 600 can include multiple processor cores, audio devices, and the like. While a particular arrangement of bus technologies and interconnections is illustrated for the purpose of example, one of skill will appreciate that the techniques disclosed herein are applicable to other system architectures. System 600 can include multiple CPUs and redundant bus controllers. One or more components can be integrated together. For example, portions of northbridge/chipset 606 can be integrated within CPU 602. Additional components of information handling system 600 can include one or more storage devices that can store machine-executable code, one or more communications ports for communicating with external devices, and various input and output (I/O) devices, such as a keyboard, a mouse, and a video display. An example of information handling system 600 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 600 can include a set of instructions that can be executed to cause the information handling system to perform any one or more of the methods or computer based functions disclosed herein. The information handling system 600 may operate as a standalone device or may be connected to other computer systems or peripheral devices, such as by a network.

In a networked deployment, the information handling system 600 may operate in the capacity of a server or as a client user computer in a server-client user network environment, or as a peer computer system in a peer-to-peer (or distributed) network environment. The information handling system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single information handling system 600 is illustrated, the term "system" shall also be taken to include any collection of systems or sub-systems that individually or jointly execute a set, or multiple sets, of instructions to perform one or more computer functions.

The information handling system 600 can include a disk drive unit and may include a computer-readable medium, not shown in FIG. 6, in which one or more sets of instructions, such as software, can be embedded. Further, the instructions may embody one or more of the methods or logic as described herein. In a particular embodiment, the instructions may reside completely, or at least partially, within system memory 604 or another memory included at system 600, and/or within the processor 602 during execution by the information handling system 600. The system memory 604 and the processor 602 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a memory to store a boot image for a boot process of the information handling system; and
   a central processing unit to load the boot image and to execute the boot process, which causes the central processing unit to:
   perform a pre-EFI initialization phase of the boot process; and during the pre-EFI initialization phase, the central processing unit to initialize a system memory for the information handling system, to determine if a basic input/output system (BIOS) attribute is set to an auto-discovery, in response to the BIOS attribute being set to the auto-discovery, the central processing unit to: perform the auto-discovery of the socket; send a ping from each communication lane of the socket; receive one or more responses to the ping from each communication lane, wherein the one or more responses includes platform information for a socket of a resource responding to the ping; configure a socket of the central processing unit during the auto-discovery of the socket based in part on the platform information; store the socket configuration in a memory, and reset the boot process at an end of the pre-EFI initialization phase.

2. The information handling system of claim 1 wherein during the auto-discovery of the socket, the central processing unit further to:
place the socket in a default communication lane configuration including first, second, third, and fourth communication lanes.

3. The information handling system of claim 2 wherein the default communication lane configuration is a full breakup of communication lanes within the socket of the central processing unit.

4. The information handling system of claim 1 wherein each of the one or more responses further includes a present indicator and a lane width for the socket of the resource responding to the ping.

5. The information handling system of claim 1 wherein the central processing unit further to:
after the boot process is reset:
perform a security phase of the boot process;
load the stored socket configuration during the pre-EFI initialization phase;
perform a driver execution environment phase of the boot process; and
perform a run time phase.

6. A method comprising:
starting a boot process of an information handling system; and
performing a pre-EFI initialization phase of the boot process, the pre-EFI initialization phase including:
determining if a basic input/output system (BIOS) attribute is set to an auto-discovery, in response to the BIOS attribute being set to the auto-discovery: initializing a system memory for the information handling system; performing the auto-discovery of the socket; sending a ping from each communication lane of the socket; receiving one or more responses to the ping from each communication lane, wherein the one or more responses includes platform information for a socket of a resource responding to the ping; configuring a socket of a central processing unit of the information handling system during the auto-discovery of the socket based in part on the platform information; performing auto-discovery lane bifurcation of the socket to determine a socket configuration; storing the socket configuration in a memory; and resetting the boot process at an end of the pre-EFI initialization phase.

7. The method of claim 6 wherein the auto-discovery of the socket comprising:
placing the socket in a default communication lane configuration including first, second, third, and fourth communication lanes.

8. The method of claim 7 wherein the default communication lane configuration is a full breakup of communication lanes within the socket of the central processing unit.

9. The method of claim 6 wherein each of the one or more responses further includes a present indicator and a lane width for the socket of the resource responding to the ping.

10. The method of claim 6 further comprising:
after the boot process is reset:
performing security phase of the boot process;
loading the stored socket configuration during the pre-EFI initialization phase;
performing a driver execution environment phase of the boot process; and
performing a run time phase.

11. A method comprising:
starting a boot process of an information handling system; and
performing a pre-EFI initialization phase of the boot process, the pre-EFI initialization phase including:
determining if a basic input/output system (BIOS) attribute is set to an auto-discovery, in response to the BIOS attribute being set to the auto-discovery:
initializing a system memory for the information handling system;
starting the auto-discovery for communication lanes of a socket of a central processing unit of the information handling system;
placing the socket in a default communication lane configuration including first, second, third, and fourth communication lanes;
sending a ping from each the first, second, third, and fourth communication lanes;
receiving one or more responses from sockets of a resource in communication with the socket of the central processing unit, wherein the one or more responses includes platform information for a socket of a resource responding to the ping;
configuring the socket of the central processing unit based on the one or more responses;
storing the socket configuration in a memory; and
resetting the boot process at an end of the pre-EFI initialization phase.

12. The method of claim 11 wherein the default communication lane configuration is a full breakup of communication lanes within the socket of the central processing unit.

13. The method of claim 11 wherein each of the one or more responses further includes a present indicator and a lane width for a socket of a resource responding to the ping.

14. The method of claim 11 further comprising:
performing a security phase of the boot process prior to performing the pre-EFI initialization phase.

15. The method of claim 11 further comprising:
after the boot process is reset:
performing security phase of the boot process;
loading the stored socket configuration during the pre-EFI initialization phase;
performing a driver execution environment phase of the boot process; and
performing a run time phase.

* * * * *